United States Patent
Kim et al.

(10) Patent No.: US 7,366,253 B2
(45) Date of Patent: Apr. 29, 2008

(54) DEVICE AND METHOD FOR TRANSMITTING AND RECEIVING DATA BY A TRANSMIT DIVERSITY SCHEME USING MULTIPLE ANTENNAS IN A MOBILE COMMUNICATION SYSTEM

(75) Inventors: Sung-Jin Kim, Suwon-si (KR); Yong-Suk Moon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 703 days.

(21) Appl. No.: 10/846,920

(22) Filed: May 17, 2004

(65) Prior Publication Data
US 2005/0037718 A1    Feb. 17, 2005

(30) Foreign Application Priority Data
May 15, 2003    (KR)    ...... 10-2003-0030886

(51) Int. Cl.
*H04L 27/04* (2006.01)
(52) U.S. Cl. ............................ 375/299
(58) Field of Classification Search ...... 375/299, 375/347, 346, 267, 316; 455/101, 132, 562.1, 455/575
See application file for complete search history.

(56) References Cited

U.S. PATENT DOCUMENTS

| | | | |
|---|---|---|---|
| 6,879,831 B2 * | 4/2005 | Hamabe | 455/442 |
| 6,898,250 B2 * | 5/2005 | Lee et al. | 375/267 |
| 2002/0186785 A1 * | 12/2002 | Hoshino et al. | 375/299 |
| 2004/0184398 A1 * | 9/2004 | Walton et al. | 370/203 |

* cited by examiner

*Primary Examiner*—Khai Tran
(74) *Attorney, Agent, or Firm*—Roylance, Abrams, Berdo & Goodman, L.L.P.

(57) ABSTRACT

In a mobile communication system, receivers measure channel characteristics using a received reference channel signal. The receivers determine a weight which has orthogonality with respect to each of a preset number of weight vectors in the mobile communication system and has the highest signal-to-interference-and-noise ratio, and feedback the weight and the corresponding signal-to-interference-and-noise ratio to the transmitter. The transmitter interprets the feedback information output from the receivers and determines receivers having feedback information which are orthogonal to each other and have the maximum throughput as an addition capacity when transmitted simultaneously, and determines weights based on the feedback information of the receivers having the maximum throughput. By applying the determined weights to the antennas using a well-known beam forming scheme, data can be transmitted to each of the determined receivers. Therefore, the present invention can maximize the efficiency in transmission capacity even with a simple transmitting and receiving structure.

14 Claims, 9 Drawing Sheets

DEVICE AND METHOD FOR TRANSMITTING AND RECEIVING DATA BY A TRANSMIT DIVERSITY SCHEME USING MULTIPLE ANTENNAS IN A MOBILE COMMUNICATION SYSTEM

PRIORITY

This application claims priority to an application entitled "Device and Method for Transmitting or Receiving Data by Transmit Diversity Scheme Using Multiple Antennas in a Mobile Communication System" filed in the Korean Intellectual Property Office on May 15, 2003 and assigned Serial No. 2003-30886, the contents of which are incorporated herein by reference.

BACKGROUND OF THE INVENTION

1. Field of the Invention

The present invention relates to a mobile communication system, and more particularly to a device and a method for transmitting and receiving data by a transmit diversity scheme using multiple antennas.

2. Description of the Related Art

Next-generation mobile communication systems have been developed to form a packet service communication system which transmits burst packet data to multiple mobile stations. Packet service communication systems have been designed to be suitable for large data transmission and to provide high-speed packet services. The $3^{rd}$ Generation Partnership Project (3GPP), which is an asynchronous mode standards group, suggests a high speed downlink packet access ("HSDPA") for high-speed packet services. Also, the $3^{rd}$ Generation Partnership Project 2 (3GPP2) synchronous standards group suggests an 1× Evolution Data Only/Voice (1×EV-DO/V) technique to provide high-speed packet services. The HSDPA and 1×EV-DO/V techniques both provide high-speed packet services in order to match Internet services such as the web. For high-speed packet services, both techniques optimize the average throughput and the peak throughput to enable smooth transmission of packet data, as well as circuit data such as voice.

Hereinafter, HSDPA will be described in more detail.

Generally, HSDPA scheme refers collectively to a high speed downlink shared channel ("HS-DSCH"), which is a downlink data channel for supporting downlink high-speed packet data transmission in a Wideband-Code Division Multiple Access (W-CDMA) communication system, related control channels, and an apparatus, system or method for the channels. Although HSDPA in the 3GPP asynchronous standards is explained herein, the present invention is applicable to any communication systems which implements transmit diversity using two or more transmit antennas.

In communication systems using HSDPA, three schemes, Adaptive Modulation and Coding (AMC), Hybrid Automatic Retransmission Request (HARQ) and Fast Cell Selection (FCS), have recently been introduced to support high-speed packet data transmission.

AMC is a data transmission scheme which improves the utilization of whole cells by selecting modulation and coding methods for different data channels according to the channel condition between cells, i.e., between the base station (Node B) and the user equipment (UE). The AMC scheme includes a plurality of modulation methods and coding methods and combines the modulation and coding methods to modulate and code data channel signals. Each combination of modulation methods and coding methods is called an Modulation and Coding Scheme (MCS). MCSs can have level 1 to level n according to the number of the MCSs. In other words, AMC adaptively determines the level of the MCSs according to the channel condition between the user equipment and the base station in an wireless network, thereby improving the overall system efficiency of the base station.

Secondarily, HARQ and more particularly n-channel Stop and Wait Hybrid Automatic Retransmission Request (N-channel SAW HARQ) will be explained in detail.

Common Automatic Retransmission Request (ARQ) exchanges an acknowledgement (ACK) signal and retransmission packet data between the user equipment and the radio network controller (RNC) of the base station. However, HARQ applies two new approaches to improve the transmission efficiency in ARQ. One is for performing a request for and a response to retransmission between the user equipment and the base station. The other is for temporarily storing data with errors, combining them with their retransmission data and transmitting the combined data. Also, HSDPA exchanges an ACK signal and retransmission packet data between the user equipment and the Media Access Control (MAC) HS-DSCH of the base station. HSDPA introduces the N-channel SAW HARQ scheme which forms logical channels in the number of N to transmit multiple packet data even when no ACK signal is received. The SAW ARQ scheme transmits next packet data only upon receiving an ACK signal for the previous packet data. Accordingly, there may be an occasion to wait for an ACK signal even at the moment when packet data can be transmitted. The N-channel SAW HARQ scheme can improve the utilization of channels by continuously transmitting multiple packet data without having received an ACK signal for the previous packet data. In other words, the N-channel SAW HARQ scheme sets logical channels in the number of N between the user equipment and the base station. If each of the N logical channels can be identified by a particular time or channel number, the user equipment can determine the logical channel through which packet data received at a particular point of time was transmitted. Also, it is possible to rearrange packet data in the order in which the packet data should be received, or to soft-combine particular packet data.

FCS is a scheme for rapidly selecting a cell in a good channel condition, among a plurality of cells, when the user equipment (UE) using the HSDPA service is in a cell overlapping region, i.e., in a soft handover region. Specifically, when the UE using HSDPA enters a cell overlapping region of a first base station and a second base station, the UE sets up a radio link with a plurality of cells, i.e., a plurality of base stations. A group of cells where a radio link with the UE is established are called an "active set." In order to reduce the overall interference, packet data for HSDPA is received only from a cell in the best channel condition, among cells in active set. The cell in the best channel condition in the active set is called a "best cell." The UE periodically checks the channel conditions of the cells in the active set to determine whether a cell having a better condition than the current best cell has been generated. If a cell having a better condition than the current best cell is generated, the UE transmits a best cell indicator to every cell in the active set in order to set that cell as the new best cell. The best cell indicator includes an identifier of the cell selected to be the best cell. Cells in the active set receive the best cell indicator and detect the cell identifier included in the best cell indicator. Each cell in the active set determines whether the cell identifier included in the best cell indicator corresponds to itself. The cell selected as the best cell transmits packet data to the UE using HS-DSCH.

As explained above, communication systems using HSDPA suggest a variety of new schemes for improving data transmission rates. Although only the HSDPA scheme has been explained above, systems such as 1×EV-DO/V system are also provided to improve data transmission rates. The 1×EV-DO/V system is focused to improve data transmission rates. In addition to AMC, HARQ and FCS schemes, a multiple antenna scheme has been proposed to overcome the limitation of the assigned bandwidths and improve the data transmission rates. The multiple antenna scheme utilizes the space domain to overcome the bandwidth limitation in the frequency domain. Generally, a nulling algorithm is used in the multiple antenna scheme.

Before explaining the multiple antenna scheme in further detail, a multiuser diversity scheduling scheme will be explained. Packet service communication systems, for example, HSDPA communication systems, determine the conditions of multiple user channels based on feedback information and send packet data only to the user channel having the best channel quality, thereby increasing the signal-to-noise ratio (SNR) gain. This is the multiuser diversity scheduling scheme. The diversity order, which represents the degree of the multiuser diversity gain, corresponds to the number of users who require a packet service simultaneously.

Hereinafter, the multiple antenna scheme will be explained in further detail.

Mobile communication systems allow multiple items of user equipment to communicate with each another through a single base station. When the base station transmits data to the multiple user equipment at a high speed, channels become faded due to the wireless channel characteristics. As a solution to overcome the fading problem, a transmit antenna diversity scheme which belongs to the multiple antenna scheme has been proposed. The transmit antenna diversity scheme transmits signals using two or more multiple antennas to minimize the loss of transmitted data caused by fading and to enhance the data transmission rates. The transmit antenna diversity scheme will be explained below in more detail.

Unlike the wire channel environment, the wireless channel environment in a mobile communication system receives signals that have become distorted from originally transmitted signals due to various factors, such as multipath interference, shadowing, radio wave attenuation, time-varying noise and interference. The fading of channels caused by the multipath interference is closely related to the reflector or the user, i.e., the mobility of the user equipment. Transmitted signals and interference signals are received in a mixed state. Therefore, signals having become greatly distorted from the originally transmitted signals are received, which degrades the performance of the mobile communication system. As a result, the fading of channels may distort the amplitude and phase of a signal which is being received. Fading is a main cause of interrupting high-speed data communication in the wireless channel environment. Studies are under progress to solve the fading problem. In other words, it is required to reduce data losses caused by the characteristics of mobile communication channels, such as fading, and user interference to achieve high-speed data transmission in a mobile communication system. Diversity schemes are generally used as a method for preventing unstable communications due to fading. One diversity scheme, spatial diversity, uses multiple antennas.

The transmit antenna diversity scheme has emerged as an effective means for solving the fading problem. This scheme receives multiple signals, which have independently undergone fading in the wireless channel environment, and deals with a distortion caused by fading. The transmit antenna diversity scheme includes various diversity methods, such as frequency diversity, multipath diversity and spatial diversity. In other words, mobile communication systems should effectively solve the fading problem, which may seriously influence the communication performance, in order to achieve high-speed data transmission. The fading of channels reduces the amplitude of a signal, which is being received, by several dB to tens of dB. The diversity schemes mentioned above are utilized to solve the fading problem. For example, a Code Division Multiple Access (CDMA) method adopts a rake receiver which can obtain diversity performance using a delay spread of channels. The rake receiver is a receive diversity system which receives a multipath signal. However, the receive diversity scheme used in the rake receiver cannot obtain a desired diversity gain when the delay spread of channels is relatively small.

The time diversity scheme uses interleaving and coding to effectively compensate for burst errors generated in the wireless channel environment. The time diversity is generally used in Doppler spread channels. However, the time diversity scheme does not produce the diversity effect in low-speed Doppler channels. The spatial diversity scheme is generally used in channels with relatively small delay spread, for example, indoor channels and pedestrian channels which are low-speed Doppler channels. The spatial diversity scheme uses more than two antennas to obtain a diversity gain. When a signal transmitted through an antenna is attenuated by fading, signals transmitted through the other antennas are received to obtain a diversity gain. The spatial diversity scheme is divided into a receive antenna diversity scheme using a plurality of receive antennas and a transmit antenna diversity scheme using a plurality of transmit antennas. However, it is difficult to apply the receive antenna diversity scheme in view of the hardware minimization of the user equipment and the manufacture cost. Accordingly, it is generally recommended that the transmit antenna diversity scheme be used in the base station. The frequency diversity scheme obtains a diversity gain from signals which were transmitted in different frequencies and took different multiple paths. Since multipath signals have different fading information, the multipath diversity scheme obtains a diversity gain by separating the multipath signals. Further, the multipath diversity scheme allows coherent transmission in harmonization with the spatial channel characteristics and increases the SNR in proportion to the number of antennas.

The transmit antenna diversity scheme is divided into two schemes, i.e., closed-loop transmit antenna diversity, which uses downlink channel information fed back from the UE, and open-loop transmit antenna diversity, which does not use feedback information. The closed-loop antenna diversity scheme measures the channel phase and power of the UE to detect the optimum weight applicable to the channel of the UE. Therefore, the base station should transmit different pilot signals to the multiple antennas to measure the channel phase and power. The UE receives the pilot signals transmitted from the base station, measures the channel phase and power, and detects the optimum weight based on the measured channel phase and power.

Another method for enhancing the transmission capacity in a packet service communication system is antenna beam forming which uses a plurality of antennas, each having its own directivity to transmit signals. Beam forming also uses a nulling scheme to prevent a signal transmitted through one antenna from acting as an interference with signals transmitted through the other antennas. However, the nulling scheme for enhancing the throughput, which is significant in the transmission of data, such as packet data, is applicable only in antenna beam forming which limits the distances between antennas. The nulling scheme cannot be used in the transmit antenna diversity scheme which arrays antennas to be spaced from each another at a relatively long distance without limiting the distances between the antennas. In antenna beam forming, antennas are spaced from each another at a relatively short distance of $\lambda/2$. In the transmit antenna diversity scheme, antennas are arrayed at a much longer distance of $10\lambda$. Since antennas far from each another lack correlation, the nulling scheme cannot be used in the transmit antenna diversity scheme.

Hereinafter, the beam forming scheme will be explained in further detail.

The beam forming scheme utilizes the nulling scheme based on the correlation between antennas spaced from each another at a relatively short distance of $\lambda/2$. As shown in Equation 1, an antenna weight is set to $w_1^H h_2=0$, $w_2^H h_1=0$ so that a receiving signal $r_1$ of a first UE cannot receive data $d_2$ of a second UE and a receiving signal $r_2$ of the second UE cannot receive data $d_1$ of the first UE.

$$r_1=(w_1^H d_1+w_2^H d_2)h_1+n_1=(w_1^H d_1+o)h_1+n_1$$

$$r_2=(w_1^H d_1+w_2^H d_2)h_2+n_2=(0+w_2^H d_2)h_2+n_2 \qquad \text{Equation 1}$$

If the channel condition is set to always generate a weight satisfying the requirements of Equation 1, the system will be able to completely null any influence of a channel on the other UE and double its capacity. In theory, nulling is possible whenever the number of UE to be subject to nulling in the beam forming environment, including a desired UE, is one less than the number of antennas. However, such a theory will be true if there is a change in phase only, while keeping the spatial correlation across antennas. Therefore, it is very difficult to implement the nulling scheme of general beam forming techniques in the wireless channel environment of mobile communications.

In the multiple antenna diversity scheme used to overcome channel fading, it is difficult to apply the nulling scheme because antennas lack correlation due to the long distance $10\lambda$ therebetween. For this reason, the base station generally uses a multiuser transmission scheme based on the orthogonality of spreading codes when simultaneously transmitting data to multiple users. Even in the multiuser transmission scheme, however, self-interference (SI) between multiple codes and multiple access interference (MAI) may occur when channels are subject to multipath fading. This may degrade the system performance. Therefore, it is necessary to apply nulling even in the multiuser transmission scheme.

As explained above, although it is important to use the nulling scheme for high-speed packet data services, the nulling scheme is applicable only in the beam forming technique which defines the distances between antennas. In general, when the antennas are spaced at a great distance, the correlation between signals of the antennas is reduced to rapidly increase the channel variation cycle, i.e., channel Doppler. Since a channel varies even within one frame of one user equipment in the existing voice communication environment, it is impossible to constantly null all channels. Particularly, in a CDMA mobile communication system, antennas are provided in a number greater than the number of simultaneous users. It is almost impossible to apply the nulling scheme because of the excess of the degree of freedom for multiple antennas (i.e., number of antennas minus (−) 1). In other words, it is difficult to apply the nulling scheme in a CDMA mobile communication system where the preset frame is much longer than the coherent time, which is a channel variation section, and where the number of users who simultaneously access is greater than the number of antennas.

Hereinafter, transmit antenna array ("TxAA"), which is a scheme included in the closed-loop transmit antenna diversity scheme, will be explained in detail.

The TxAA scheme has two operation modes, a first TxAA mode ("TxAA Mode 1") and a second TxAA mode ("TxAA Mode 2"). In TxAA Mode 1, the UE calculates weights $W_1$ and $W_2$, which will be used in UTRAN to maximize the receive power of a signal received by the UE, using a pilot signal transmitted from the base station. The calculated weights $W_1$ and $W_2$ are transmitted to the base station through a feedback information (FBI) field of a particular channel, for example, a dedicated physical control channel (DPCCH). Four weights 00, 01, 10 and 11 can be used in the UTRAN which operates in TxAA Mode 1. While TxAA Mode 1 adjusts the phase only, TxAA Mode 2 adjusts both the phase and the amplitude, i.e., every power information. There are 16 possible weights which can be used in the UTRAN. Each of the 16 weights has a value distinguishing a phase from an amplitude.

The weight w is a value relevant to a transmission channel. For example, w=h* (wherein w and h are vectors). Also, h refers to a transmit antenna array channel. Generally, in mobile communication systems using FDD (Frequency Division Duplex), transmission channels and receiving channels having different characteristics. In order to inform the base station of the transmission channel (h), the UE should feedback the transmit channel information to the base station. To this end, TxAA Mode 1 or TxAA Mode 2 are set to enable the UE to calculate the weight which will be obtained from the channel information (h) and feedback the weight information to the base station. TxAA Mode 1 quantizes and feedbacks only the phase component $\theta_2-\theta_1$ in the weight information (w=[|w_1|exp(j\theta_1), |w_2|exp(j\theta_2)]) (wherein $w_1$ and $w_2$ are scalar components). Thus, the phase precision becomes $\pi/2$, while the maximum quantization error becomes $\pi/4$. In addition, a refine mode which updates only one of two bits at every moment is used to improve the feedback efficiency. For example, combinations of bits can be {b(2k), b(2k−1)} and {b(2k), b(2k+1)} (wherein b represents a bit fed back per slot at every moment). TxAA Mode 2 feedbacks both the phase and the amplitude, which are components of the weight information. The phase is fed back in 3 bits, whereas the amplitude is fed back in 1 bit. Accordingly, the phase precision becomes $\pi/4$, while the maximum quantization error becomes $\pi/8$. Also, a progressive refine mode which updates only one of four bits at every moment is used to improve the feedback efficiency. In the refine mode, each bit is a value of orthogonal basis. However, the progressive refine mode does not have such a definition.

Communication systems supporting HSDPA transmit packet data in a particular unit, for example, in frames, only to a UE having the best channel condition at that time of transmission. In other words, HSDPA communication systems use the multiuser diversity scheme. The systems receive channel quality information from multiple UE which have requested HSDPA services, and determine the channel conditions of the multiple UE based on the received channel quality information. The systems select a UE having the best channel condition and transmit packet data to the selected UE only. Even when the system transmission capacity resource is large enough, the HSDPA communication systems transmit packet data to the selected UE only, thereby reducing the transmission efficiency. Also, as explained above, it is difficult to apply the nulling scheme in the HSDPA communication systems.

SUMMARY OF THE INVENTION

Accordingly, the present invention has been made to solve the above-mentioned problems occurring in the prior art, and one object of the present invention is to provide a device and a method for transmitting and receiving data by a multiple antenna diversity scheme in a mobile communication system.

Another object of the present invention is to provide a multiple antenna diversity system and a method for maximizing the transmission capacity in a mobile communication system.

Still another object of the present invention is to provide a device and a method for transmitting data by a multiple antenna diversity scheme using a nulling scheme in a mobile communication system.

In order to substantially accomplish the above objects, there is provided a device for transmitting data by a transmit diversity scheme using multiple antennas in a mobile communication system having a transmitter comprising at least two antennas, said device comprising: a feedback information processor for interpreting feedback information received from a plurality of receivers, determining receivers having feedback information which are orthogonal to each other and have the maximum throughput as an addition capacity when transmitted simultaneously, and determining weights based on the feedback information of the receivers having the maximum throughput; and a signal transmitter for applying each of the determined weights to each antenna and transmitting data to each of the determined receivers.

In accordance with another aspect of the present invention, there is provided a device for receiving transmitted data by a multiple antenna diversity scheme in a mobile communication system comprising at least two antennas, said device comprising: a signal receiver for despreading and descrambling a received reference channel signal; and a feedback information generator for measuring channel characteristics based on the despread and descrambled reference channel signal and determining a weight having orthogonality to each of a preset number of weights in the mobile communication system and a weight having the highest signal-to-interference-and-noise ratio in consideration of the channel characteristics.

In order to substantially accomplish the above objects of the present invention, there is also provided a method for transmitting data by a transmit diversity scheme using multiple antennas in a mobile communication system having a transmitter comprising at least two antennas, said method comprising the steps of: a feedback information processing step of interpreting feedback information received from a plurality of receivers, determining receivers having feedback information which are orthogonal to each other and which have the maximum throughput as an addition capacity when transmitted simultaneously, and determining weights having the maximum throughput; and a signal transmitting step of applying each of the determined weights to each antenna and transmitting data to each of the determined receivers.

In accordance with another aspect of the present invention, there is also provided a method for receiving transmitted data by a transmit diversity scheme using multiple antennas in a mobile communication system having a transmitter comprising at least two antennas, said method comprising: a signal receiving step of despreading and descrambling a received reference channel signal; and a feedback information generating step for measuring channel characteristics based on the despread and descrambled reference channel signal and determining a weight having orthogonality to each of a preset number of weights in the mobile communication system and a weight having the highest signal-to-interference noise ratio in consideration of the channel characteristics.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, an embodiment of the present invention will be described with reference to the accompanying drawings. In the following description of the present invention, a detailed description of known functions and configurations incorporated has been omitted for conciseness.

Figure 1:
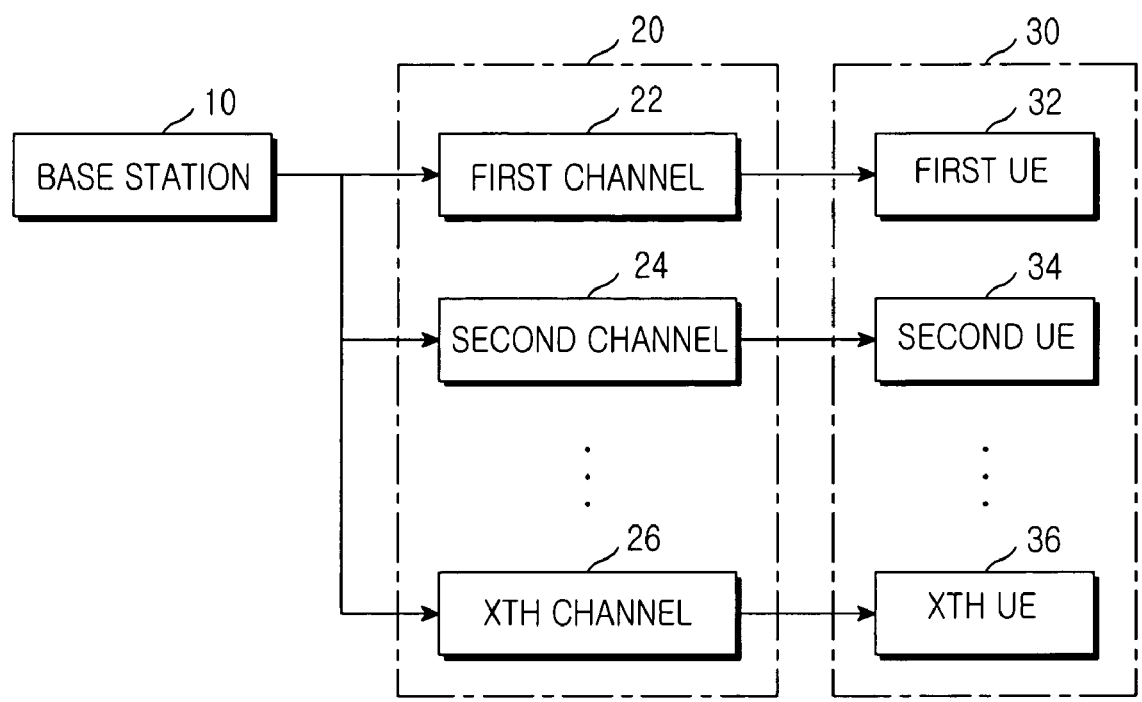
FIG. 1 is a block diagram illustrating an example of a packet communication system performing functions according to an embodiment of the present invention.

FIG. 1 is a block diagram illustrating an example of a packet communication system according an embodiment of the present invention.

Referring to FIG. 1, a base station (Node B) 10 is a system for supporting packet services, for example, a system using a high speed downlink packet access ("HSDPA") technique for performing large data transmission. A first user equipment (UE) 32 to an $X^{th}$ user equipment (UE) 36 are connected to the base station 10 by a wireless network to receive packet services. The base station 10 uses a transmit antenna diversity scheme which belongs to a multiple antenna diversity scheme. More particularly, the base station 10 uses a transmit antenna array ("TxAA") of the transmit antenna diversity scheme. TxAA has two operation modes, i.e., a first TxAA mode ("TxAA Mode 1") and a second TxAA mode ("TxAA Mode 2"). The base station 10 sends pilot signals. The first user equipment 32 to the $X^{th}$ user equipment 36 receives the pilot signals and measures channel characteristics of downlink channels. The user equipment 32 to 36 generates feedback information based on the measured channel characteristics. Each of the user equipment 32 to 36 sends the feedback information to the base station 10 through the feedback information (FBI) field of a particular channel, for example, a dedicated physical control channel (DPCCH), or through a separate control channel other than the DPCCH. Hereinafter, a case when the base station 10 uses TxAA Mode 1 for transmit antenna diversity will be exemplified to describe the present invention.

The base station 10 provides a plurality of transmit antennas and uses an antenna beam forming scheme. The base station 10 also uses a multiuser transmission scheme based on the orthogonality of spreading codes. As shown in FIG. 1, the base station comprises X number of spreading codes. The base station 10 transmits a first channel 22 to a $X^{th}$ channel 26 which have been spread by the X spreading codes. Each of the X spreading codes has orthogonality with respect to the channels transmitted respectively to the first to $X^{th}$ user equipment 32 to 36.

A process of transmitting data by a multiple antenna diversity scheme, i.e., a transmit diversity scheme using transmit antennas, will be explained in detail with reference to FIG. 2.

Figure 2:
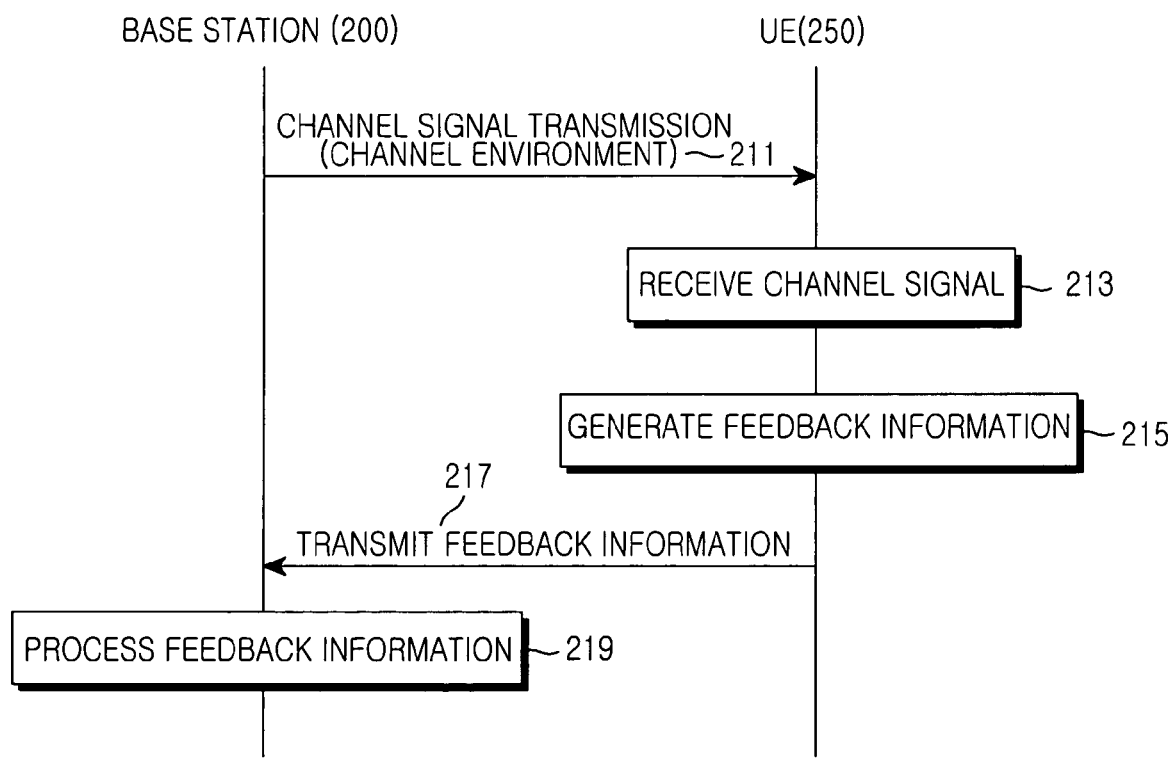
FIG. 2 is a flow chart illustrating an example of a process of transmitting data by the multiple antenna diversity scheme in a mobile communication system according to the embodiment of the present invention.

FIG. 2 is a flow chart illustrating an example of a process of transmitting data by the multiple antenna diversity scheme in a mobile communication system according to the embodiment of the present invention.

Referring to FIG. 2, the base station 200 transmits a channel signal to the user equipment (step 211). The channel signal is a sum of a high speed downlink shared channel ("HS-DSCH") signal and a pilot channel signal. Since the HS-DSCH is a common channel, the channel signal from the base station 200 is transmitted to a plurality of user equipment. For explanatory convenience, it is assumed that the channel signal is transmitted to a particular user equipment 250 as shown in FIG. 2. The channel signal transmitted from the base station 200 undergoes a channel environment which will be explained below.

The mobile communication system adopts the transmit diversity scheme using multiple antennas. Therefore, the base station 200 provides a plurality of transmit antennas, i.e., at least two transmit antennas, and sends channel signals through the transmit antennas. Each of the signals output through the plurality of transmit antennas has channel characteristics consisting of a gain, a phase and a delay, which are dependent on multiple transmit antennas and multiple paths. The channel characteristics dependent on multiple transmit antennas and multiple paths can be represented by Equation 2.

$$\left\{ h_{n,k_O}(t) - \sum_{l=0}^{L-1} h_{n,l,k_n} \cdot \delta(i - lT_c) \right\}$$ Equation 2

In Equation 2, n represents a transmit antenna number, k represents a user equipment number, l represents a multipath number which may be one of 1 to L, $\delta(x)$ represents a delta function having an area of 1 when x=0, and $T_c$ represents a multipath time delay.

Signals output from respective transmit antennas have the channel characteristics as shown in Equation 2. At the same time, noise on the wireless channels is added to the signals. The signals having the channel characteristics and noise added are received by the user equipment 250 (step 213). The signals received by the user equipment 250 can be represented by Equation 3.

$$\left\{ r_{k_O}(t) - \sum_{n=1}^{N} \sum_{l=0}^{L-1} h_{n,l,k_0} \cdot \chi_n(t - lT_c) + n(t) \right\}$$ Equation 3

In Equation 3, $X_n$ represents a signal transmitted to the $n^{th}$ antenna.

The user equipment 250 detects characteristics of downlink channels, i.e., TxAA Model 1 channels, based on the received channel signals and particularly pilot channel signals. The user terminal 250 generates feedback information using the characteristics of the detected TxAA Mode 1 channels (step 215). The user equipment 250 sends the feedback information to the base station 200 through the feedback information field (step 217). The base station 200 receives the feedback information from the user equipment 250 and processes the received feedback information (step 219). Although not illustrated in FIG. 2, the base station 200 also receives feedback information from all other user equipment and processes all the received feedback information to control the data transmission.

Hereinafter, the configurations of the base station and the user equipment for performing functions according to the embodiment of the present invention will be explained with reference to FIG. 3.

Figure 3:
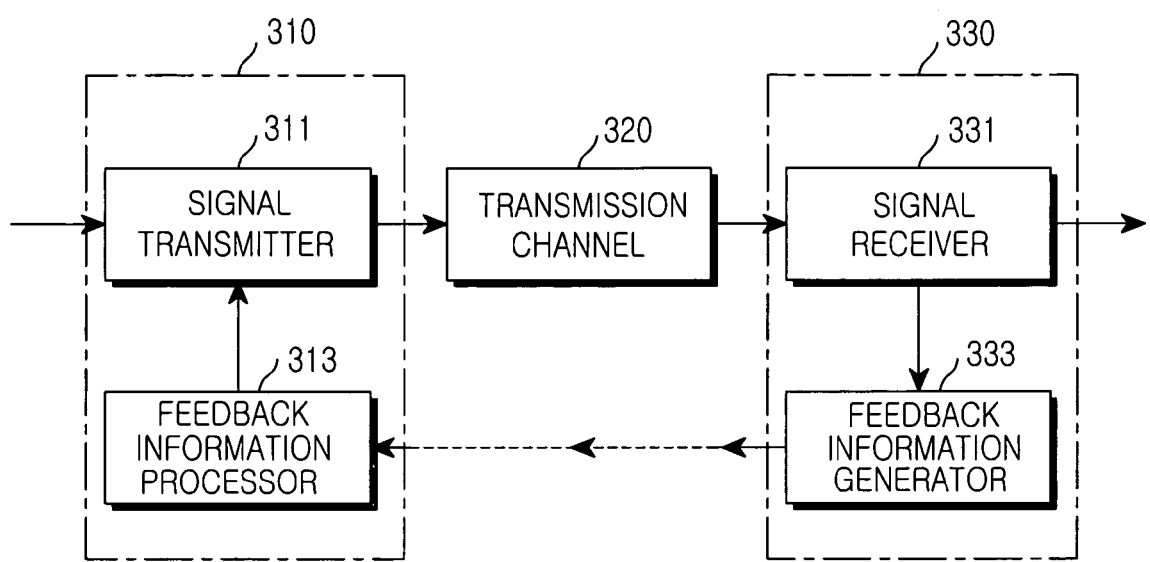
FIG. 3 is a block diagram illustrating an example of the configurations of a base station and a user equipment according to the embodiment of the present invention.

FIG. 3 is a block diagram illustrating an example of the configurations of the base station and the user equipment for performing functions according to the embodiment of the present invention.

Referring to FIG. 3, the base station 310 comprises a signal transmitter 311 and a feedback information processor 313. The user equipment 330 comprises a signal receiver 331 and a feedback information generator 333. The signal transmitter 311 selects a particular number of HS-DSCHs based on the control information received from the feedback information processor 313. Also, the signal transmitter 311 amplifies, modulates and encodes the selected HS-DSCHs using the transmit powers and the modulation and coding schemes which correspond to the control information received from the feedback information processor 313, and transmits the amplified, modulated and encoded HS-DSCHs. Signals outputted from the signal transmitter 311 are received by the signal receiver 331 of the user equipment 330 through a transmission channel 320. The transmission channel 320 is the same as the channel environment explained in relation to step 211 of FIG. 2. Accordingly, a further detailed explanation of the transmission channel 320 will not be made.

The signal receiver 331 receives signals output from the signal transmitter 311 through the transmission channel 320. The signal receiver 331 despreads and descrambles the signals received through the transmission channel 320 by applying different delay values to respective multiple paths. Equation 4 shows signals despread and descrambled in multiple paths.

$$y[k_0, l_0] = \int_{lT_C}^{lT_C+T} r_{k_0}(t) C_{SP,SC}[k_0](t - l_0 T_c) dt \quad \text{Equation 4}$$

$$= y_d[k_0, l_0] + y_{SI}[k_0, l_0] + y_{MAI}[k_0, l_0] + n'[k_0, l_0]$$

wherein $$y_d[k_0, l_0] = \sum_{n=1}^{N} h_{n,l_0,k_0} \cdot w_n^*[k_0] \cdot x[k_0]$$

$$y_{SI}[k_0, l_0] = \sum_{\substack{l=0 \\ l \neq l_0}}^{L-1} \sum_{n=1}^{N} h_{n,l,k_0} \cdot w_n^*[k_0] \cdot x[k_0] R_{k_0,k_0}(l - l_0)$$

$$y_{MAI}[k_0, l_0] = \sum_{\substack{k=1 \\ k \neq k_0}}^{K_C} \sum_{\substack{l=0 \\ l \neq l_0}}^{L-1} \sum_{n=1}^{N} h_{n,l,k_0} \cdot w_n^*[k] \cdot x[k] R_{k,k_0}(l - l_0)$$

where $R_{k,k_0}(l_\Delta) = \int_0^T c_{SP,SC}(t - l_\Delta T_C) c_{SP,SC}^*(t) dt$ Equation 4 shows a signal despread in path $l_o$ of the user equipment $k_o$.

Signals from multiple paths, which have been despread and descrambled according to Equation 4, are combined as shown in Equation 5, using weights $\{W_R[l_o]|l_o=0, \ldots, L_o-1\}$ based on the signal-to-interference-and-noise ratios ("SINR") of the multiple paths.

$$y[k_0] = \sum_{l_0=0}^{l_0-1} w_R^*[l_0] \cdot y[k_0, l_0] \quad \text{Equation 5}$$

$$= \int_{lT_C}^{lT_C+T} \sum_{l_0=0}^{L_0-1} w_R^*[l_0] \cdot r_{k_0} c_{SP,SC}[k_0](t - l_0 T_c) dt$$

To detect a combined signal in Equation 5, a SINR is calculated by Equation 6.

$$S(w_o, \gamma_o) = \arg\max_i \gamma_i, \quad \text{Equation 6}$$

where $\gamma_i = \dfrac{\|H_{w_i}\|^2}{\sum \|H_{w_i^\perp}(j)\|^2 + N_0/E_b}$

The signal receiver 331 outputs the combined signal to the feedback information generator 333. The feedback information generator 333 receives the combined signal from the signal receiver 331 and transmits feedback information, i.e., the highest SINR of each weight and the corresponding weight index, to the base station 310.

The operation of the signal transmitter 311 will be explained in detail with reference to FIG. 4.

Figure 4:
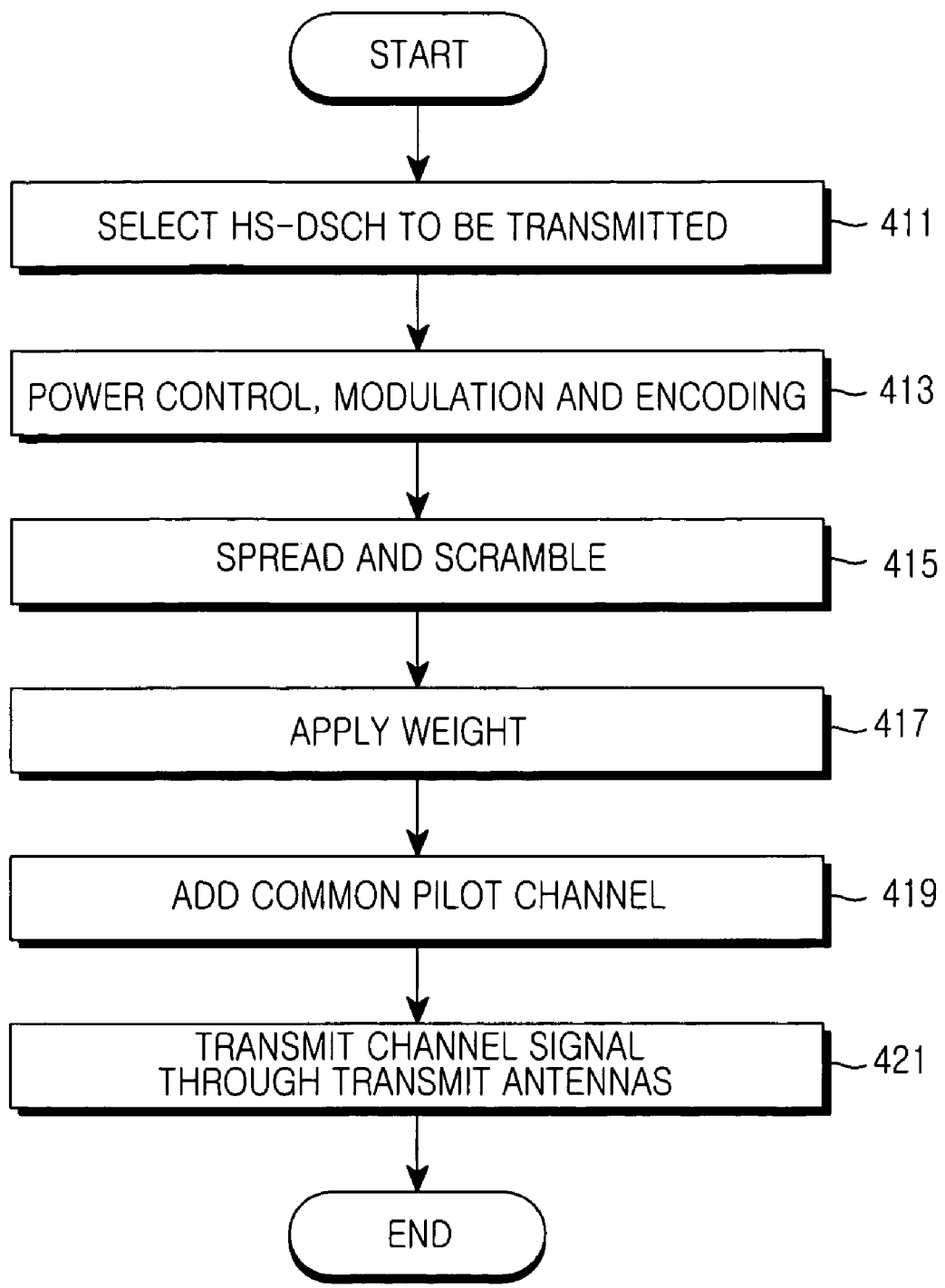
FIG. 4 is a flow chart illustrating an example of the operation of a signal transmitter 311 of FIG. 3.

FIG. 4 is a flow chart illustrating an example of the operation of the signal transmitter 311 of FIG. 3.

Referring to FIG. 4, at step 411, the signal transmitter 311 selects $K_c$ HS-DSCHs from K HS-DSCHs (i.e., first to $K^{th}$ HS-DSCHs) to correspond to the channel selection information of the control information output from the feedback information processor 313. At step 413, the signal transmitter 311 modulates, encodes and power-controls the selected $K_c$ HS-DSCHs to correspond to the modulation and coding scheme information and the power control information, among information output from the feedback information processor 313. At step 415, the signal transmitter 311 spreads and scrambles the modulated, encoded and power-controlled $K_c$ HS-DSCHs, using the preset spreading codes and scrambling codes. At step 417, the signal transmitter 311 multiplies the spread and scrambled $K_c$ HS-DSCHs by the preset weights for transmit antennas. At step 419, the signal transmitter 311 adds common pilot channel (CPICH) signals applied to the pertinent transmit antennas to the HS-DSCHs multiplied by weights. At step 421, the signal transmitter 311 sends the channel signals with the common pilot channel signals added through the transmit antennas.

The inner configuration of the signal transmitter 311 will be explained with reference to FIG. 5.

Figure 5:
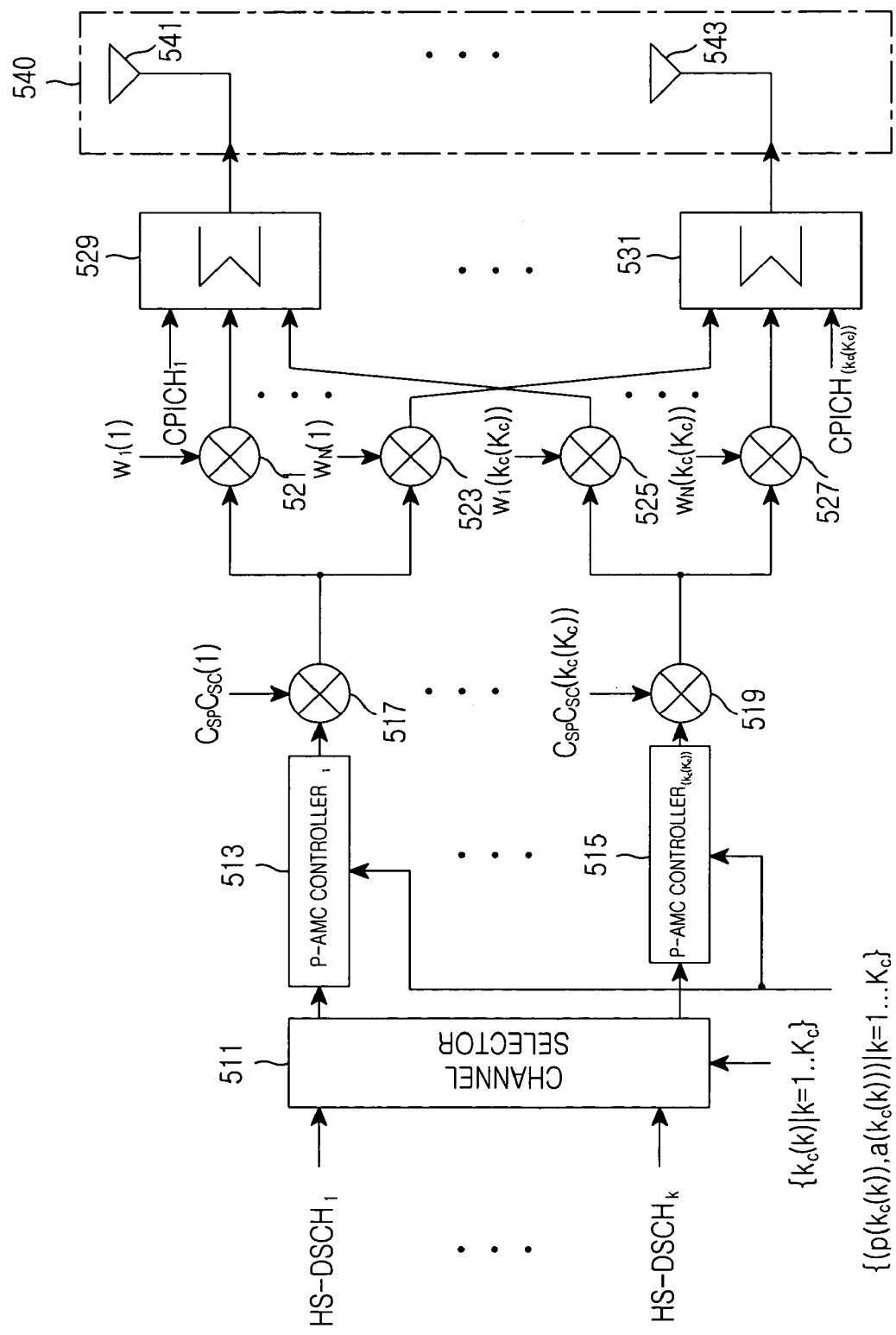
FIG. 5 is a block diagram illustrating an example of the inner configuration of the signal transmitter 311 of FIG. 3.

FIG. 5 is a block diagram illustrating an example of the inner configuration of the signal transmitter 311 of FIG. 3.

Referring to FIG. 5, the signal transmitter 311 consists of a channel selector 511, a plurality of Power-Adaptive Modulation and Coding (P-AMC) controllers 513 and 515, a plurality of multipliers 517, 519, 521, 523, 525 and 527, a plurality of adders 529 and 531, and a plurality of transmit antennas 541 and 543. The channel selector 511 selects $K_c$ HS-DSCHs $\{HS\text{-}DSCH(k_c(k))|k=1, \ldots, K_c)\}$ from K HS-DSCHs, i.e., first to $K^{th}$ HS-DSCHs $\{HS\text{-}DSCH(k_c(k)) |k=1, \ldots, K)\}$, to correspond to the channel selection information $\{k_c(k)|k=1, \ldots, K_c\}$ among the control information output from the feedback information processor 313. The channel selector 511 outputs the selected HS-DSCHs to the P-AMC controllers 513 and 515. $K_c$ refers to the number of HS-DSCHs which are transmitted simultaneously from the signal transmitter 311. Each of the P-AMC controllers 513 and 515 receives the $K_c$ HS-DSCHs $\{HS\text{-}DSCH(k_c(k)) |k=1, \ldots, K_c)\}$ output from the channel selector 511 and adjusts the transmit power to correspond to the power and the modulation and coding scheme of the control information output from the feedback information processor 313. The P-AMC controllers 513 and 515 modulate and encode the $K_c$ HS-DSCHs and outputs them to the multipliers 517 and 519. More specifically, the P-AMC controllers 513 and 515 modulate $K_c$ HS-DSCHs $\{HS\text{-}DSCH(k_c(k)|k=1, \ldots, K_c)\}$ output from the channel selector 511 to correspond to the modulation scheme information, i.e., modulation orders $\{a(k_c(k))|k=1, \ldots, K_c\}$ output from the feedback information processor 313. The P-AMC controllers 513 and 515 encode the modulated $K_c$ HS-DSCHs $\{HS\text{-}DSCH(k_c(k) |k=1, \ldots, K_c)\}$ to correspond to the coding scheme information, i.e., i.e., coding rates $\{c(k_c(k))|k=1, \ldots, K_c\}$, output from the feedback information processor 313. The P-AMC controllers 513 and 515 control the power of each of the modulated and encoded $K_c$ HS-DSCHs $\{HS\text{-}DSCH(k_c(k)|k=1, \ldots, K_c)\}$ to correspond to the power information $\{p(k_c(k))|k=1, \ldots, K_c\}$, and output them to the multipliers 517 and 519. To control the power of the modulated and encoded $K_c$ HS-DSCHs $\{HS\text{-}DSCH(k_c(k)|k=1, \ldots, K_c)\}$ to correspond to the power information $\{p(k_c(k))|k=1, \ldots, K_c\}$, each of the modulated and encoded $K_c$ HS-DSCHs $\{HS\text{-}DSCH(k_c(k)|k=1, \ldots, K_c)\}$ is multiplied by each square root $p^{1/2}(k_c(k))$ of the power information $\{p(k_c(k)) |k=1, \ldots, K_c\}$.

The multipliers 517 and 519 receive signals output from the P-AMC controllers 513 and 515, and spread and scramble them with preset spreading codes and scrambling codes. The signals output from the P-AMC controllers 513 and 515 are represented by Equation 7.

$$\{x(k_c(k))=p^{1/2}(k_c(k))\cdot s(k_c(k))|k=1,\ldots,K_c\}$$ Equation 7

In Equation 7, p represents transmit power and $k_c$ represents the total number of selected user equipment.

The multipliers 517 and 519 receive the power-controlled, modulated and encoded HS-DSCH signals $\{x(k_c(k))=p^{1/2}(k_c(k))\cdot s(k_c(k))|k=1,\ldots,K_c\}$, and spread and scramble the signals with corresponding spreading codes and scrambling codes. The spreading codes and the scrambling codes are represented by Equation 8.

$$\{c_{SP,SC}[k_c(k)](t)=c_{SP}[k_c(k)](t)\cdot c_{SC}[k_c(k)](t)|k=1,\ldots,K_c,\ 0\leq t<T\}$$ Equation 8 where $c_{SP}[k_c(k)](t)$ represents a spreading code and $c_{SC}[k_c(k)](t)$ represents a scrambling code.

Signals output from the multipliers 517 and 519, i.e., spread spectrum signals, are represented by Equation 9.

$$\{x_c[k_c(k)](t)=x[k_c(k)]\cdot c_{SP,SC}[k_c(k)](t)|k=1,\ldots,K_c,\ 0\leq t<T\}$$ Equation 9

The signals output from the multipliers 517 and 519 are input to each of the multipliers 521, 523, 525 and 527. The multipliers 521, 523, 525 and 527 multiply each of the signals output from the multipliers 517 and 519 by a predetermined weight $\{w_n[k_c(k)]|n=1,\ldots,N,\ k=1,\ldots,K_c\}$ and output the multiplied signals to the adders 529 and 531. The adders 529 and 531 add corresponding common pilot channel (CPICH) signals $\{CPICH_n|n=1,\ldots,N\}$ to the signals $\{w_n[k_c(k)]\cdot x_c[k_c(k)](t)|k=1,\ldots,K_c,\ n=1,\ldots,N,\ 0\leq t<T\}$ output from the multipliers 521, 523, 525 and 527, and output the summed-up signals to the antennas 541 and 543. The signals output from the adders 529 and 531 are represented by Equation 10.

$$\left\{x_w[n](t)=\sum_{k=1}^{K_n}w_n[k_c(k)]\cdot\chi_c[k_c(k)](t)\,\bigg|\,0\leq t<T,\ n=1,\ldots,N\right\}$$ Equation 10

The operation of the feedback information generator 333 will be explained in detail with reference to FIG. 6.

Figure 6:
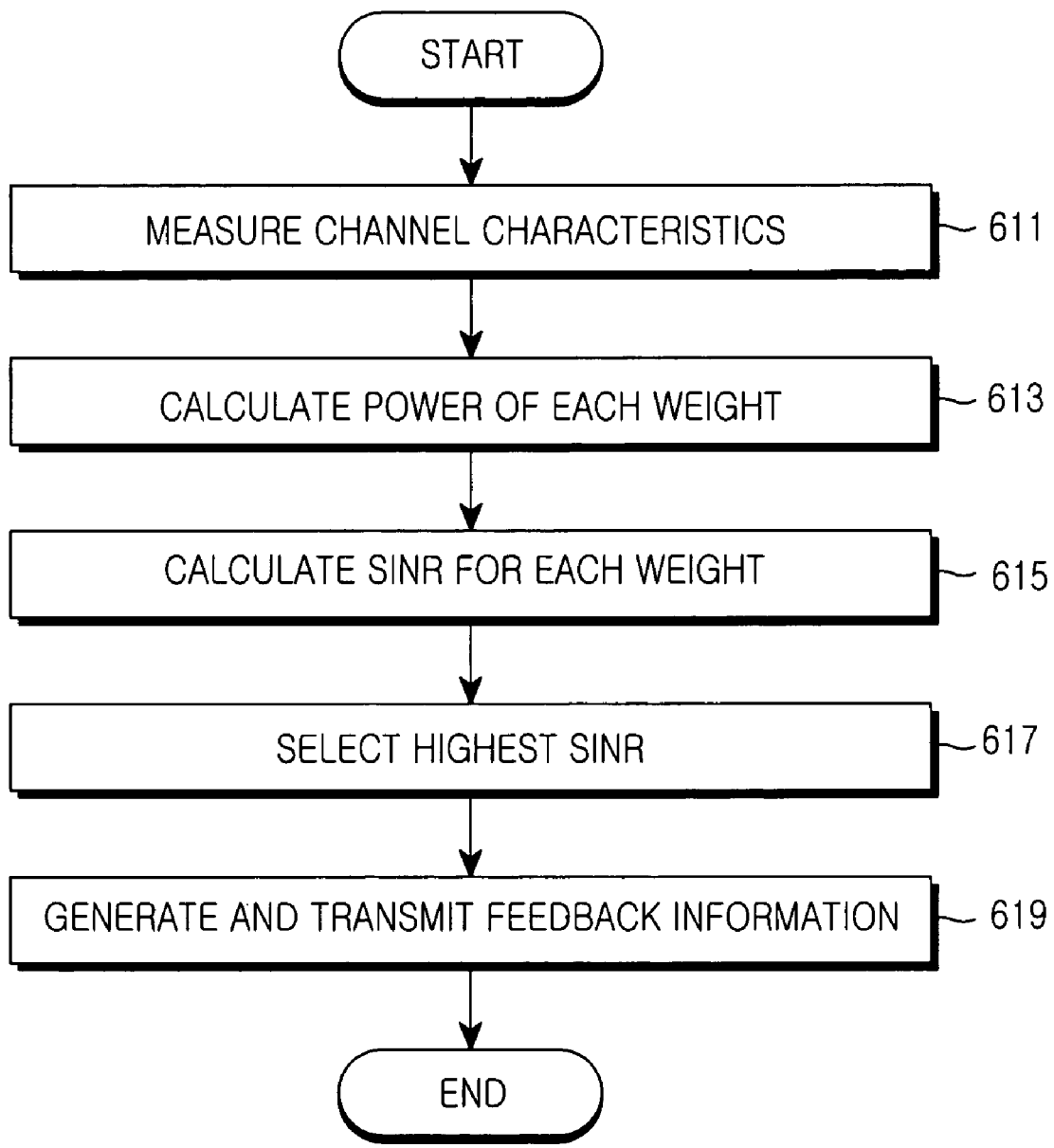
FIG. 6 is a flow chart illustrating an example of the operation of a feedback information generator 333 of FIG. 3.

FIG. 6 is a flow chart illustrating an example of the operation of the feedback information generator 333 of FIG. 3.

Referring to FIG. 6, at step 611, the feedback information generator 333 measures multiple antenna multipath channel characteristics of each user equipment based on the combined channel signals output from the signal receiver 330, and more particularly the common pilot channel signals. At step 613, the feedback information generator 333 applies each of a preset number of weight vectors for each transmit diversity mode in the mobile communication system to the measured channel characteristics and calculates the power of each weight vector. At step 615, the feedback information generator 333 selects one by one from powers of the respective weight vectors. For example, the feedback information generator 333 selects the power of the first weight vector and calculates a SINR based on the weights having orthogonality with respect to the weight vector corresponding to the selected power, i.e., the first weight vector. In the same manner, powers are generated using the weights having orthogonality with respect to the weight vector corresponding to each selected power. Also, the feedback information generator 333 calculates SINRs based on the powers generated using the weights having orthogonality with respect to the weight vector corresponding to each selected power. At step 617, the feedback information generator 333 selects the highest SINR for each weight, among the SINRs calculated for the weights having orthogonality with respect to the corresponding weight vector. At step 619, the feedback information generator 333 generates feedback information about the selected highest SINR for each weight and the indices of the weights having orthogonality with respect to the corresponding weight vector, and send the feedback information to the base station.

The inner configuration of the feedback information generator 333 will be explained in detail with reference to FIG. 7.

Figure 7:
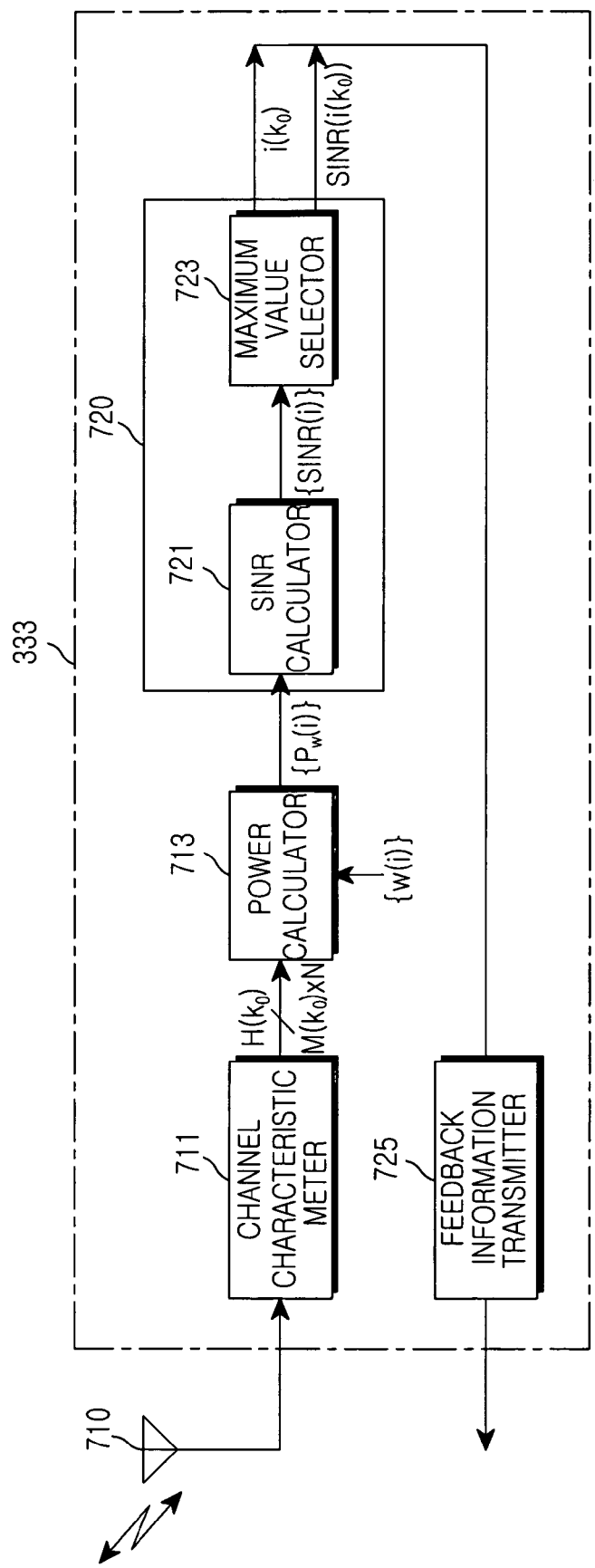
FIG. 7 is a block diagram illustrating an example of the inner configuration of the feedback information generator 333 of FIG. 3.

FIG. 7 is a block diagram illustrating an example of the inner configuration of the feedback information generator 333 of FIG. 3.

Referring to FIG. 7, the feedback information generator 333 comprises a channel characteristic meter 711, a power calculator 713, a maximum SINR calculator 720 and a feedback information transmitter 725. The maximum SINR calculator 720 consists of a SINR calculator 721 and a maximum value selector 723.

When a pilot channel signal is received through a receive antenna 710, it is transmitted to the channel characteristic meter 711. The channel characteristic meter 711 receives the pilot channel signal and measures the multiple antenna multipath channel characteristic $H(k_o)=\{H[l.n](k_o)\}=\{h_{n,l,k}|n=1,\ldots,N,\ l=0,\ldots,L(k_o)-1,\ k=k_o\}$ for each item of user equipment. The channel characteristic meter 711 outputs the measured channel characteristic $H(k_o)$ to the power calculator 713. The channel characteristic $H(k_o)$ is a $L(k_o)\times N$ matrix.

The power calculator 713 applies each weight vector $\{w(i)|I=1,\ldots,I\}$ to the channel characteristic $H(k_o)$ output from the channel characteristic meter 711 to calculate powers $\{P_w(i)=|H(k_o)w(i)|^2|I=1,\ldots,I\}$ of respective weight vectors. The power calculator 713 outputs the calculated powers to the SINR calculator 721. The SINR calculator 721 selects one by one from the powers $\{P_w(i)=|H(k_o)w(i)|^2|I=1,\ldots,I\}$ output from the power calculator 713. For example, the SINR calculator 721 select the power of the first weight vector, and generates a power using the weights having orthogonality with respect to the weight vector used in the selected power, i.e., the first weight vector. Assume that a power selected from the powers $\{P_w(i)=|H(k_o)w(i)|^2|I=1,\ldots,I\}$ is $P_w(i_o)$ and the weight vector used to generate the power $P_w(i_o)$ is $w(i_o)$. Also, the weights orthogonal to the weight vector $w(i_0)$ are defined to be $\{w(j_o)|w(j_o)\perp w(i_o),\ j_o=1,\ldots,I\}$. Also, the powers calculated based on the weights $\{w(j_o)|w(j_o)\perp w(i_o),j_o=1,\ldots,I\}$ orthogonal to the weight vector $w(i_o)$ are defined to be $\{P(j_o)|w(j_o)\perp w(i_o),\ j_o=1,\ldots,I\}$. The SINR calculator 721 calculates a SINR for each weight using the selected power $P_w(i_o)$ and the calculated power $\{P(j_o)|w(j_o)\perp w(i_o),j_o=1,\ldots,I\}$, and outputs the calculated SINR to the maximum value selector 723. The SINR calculator 721 performs the same calculation for the power $\{P(j_0)|w(j_0)\perp w(i_0),j_0=1,\ldots,I\}$ of each weight vector to calculate a SINR for each weight, and outputs the calculated SINR to the maximum value selector 723. The SINR calculator 721 calculates the SINR as indicated in Equation 6.

The maximum value selector 723 receives SINRs $\{SINR_i|I=1,\ldots,I\}$ calculated for the respective weights and output from the SINR calculator 721, and selects the maximum value, i.e., the highest SINR. Subsequently, the maximum value selector 723 sends the highest SINR and the index of the weight having the SINR to the feedback information transmitter 725. The selected highest SINR is defined as SINR(i($k_o$)). Accordingly, the maximum value selector 723 outputs the highest SINR SINR(i($k_o$)) and the index i($k_o$) of the weight having the SINR to the feedback information transmitter 725. The feedback information transmitter 725 includes the highest SINR SINR(i($k_o$)) and the index i($k_o$) of the weight having the SINR in the feedback information field of DPCCH and sends them to the base station.

The operation of the feedback information processor 313 will be explained in detail with reference to FIG. 8.

Figure 8:
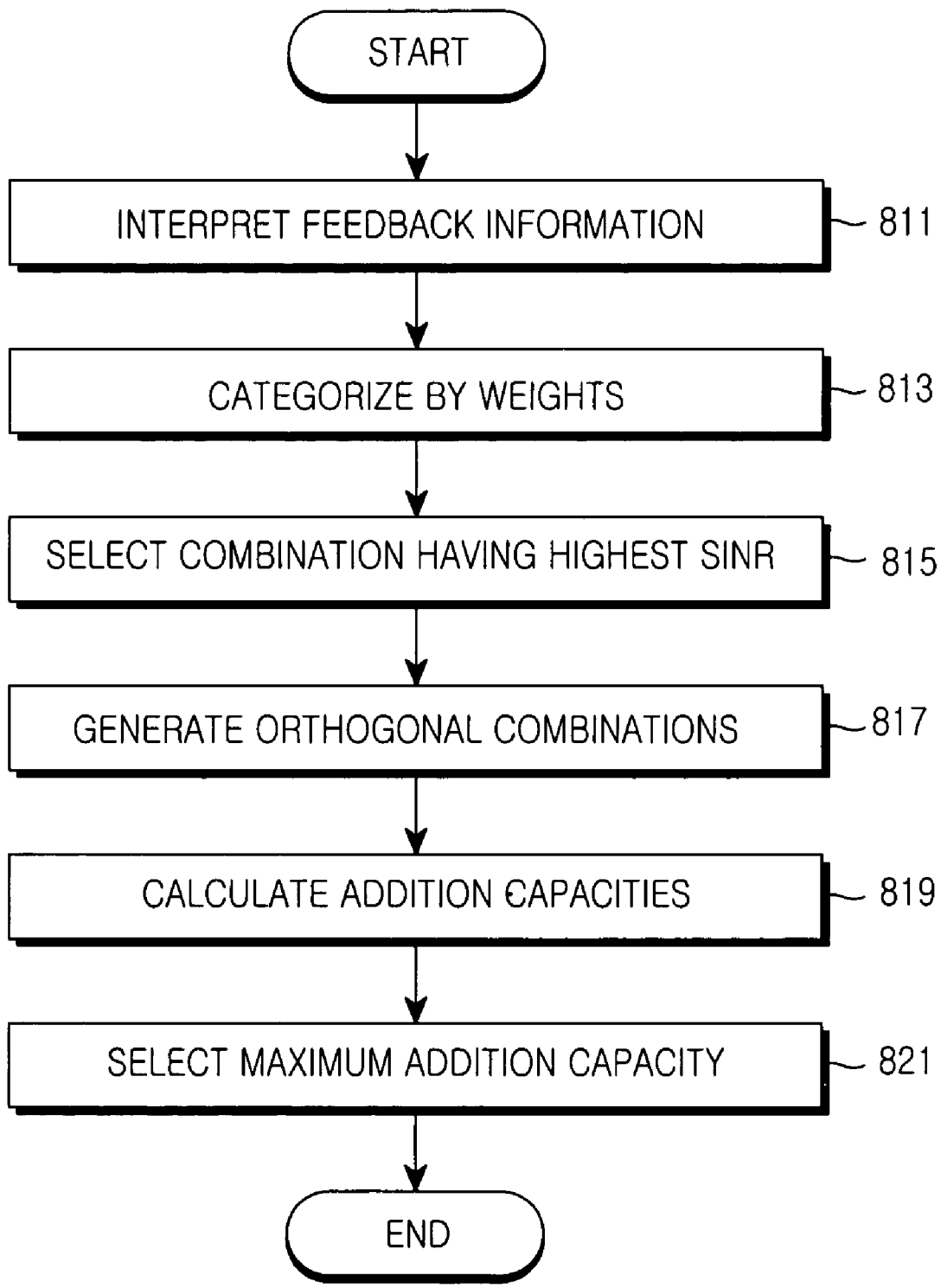
FIG. 8 is a flow chart illustrating an example of the operation of a feedback information processor 313 of FIG. 3.

FIG. 8 is a flow chart illustrating an example of the operation of the feedback information processor 313 of FIG. 3.

Referring to FIG. 8, at step 811, the feedback information processor 313 interprets the feedback information transmitted through the feedback information field of DPCCH from each user equipment to determine the highest SINR and the weight index corresponding to the highest SINR. At step 813, the feedback information processor 313 combines the interpreted results according to the respective user equipment and classifies the combined results, which includes weight indices and highest SINRs, according to the kinds of weight. At step 815, the feedback information processor 313 selects a combination having the highest SINR, among the combinations classified by the kinds of weight. At step 817, the feedback information processor 313 generates orthogonal combinations among the above combination results having highest SINRs and corresponding weight indices. The orthogonal combinations have orthogonal weights corresponding to the weight indices. At step 819, the feedback information processor 313 calculates a sum capacity for each orthogonal combination, i.e., a throughput. At step 821, the feedback information processor 313 selects an orthogonal combination having the maximum sum capacity and generates control information about the indices, weight vectors, power, and modulation and coding schemes for the corresponding user equipment.

The inner configuration of the feedback information processor 313 will be explained in detail with reference to FIG. 9.

Figure 9:
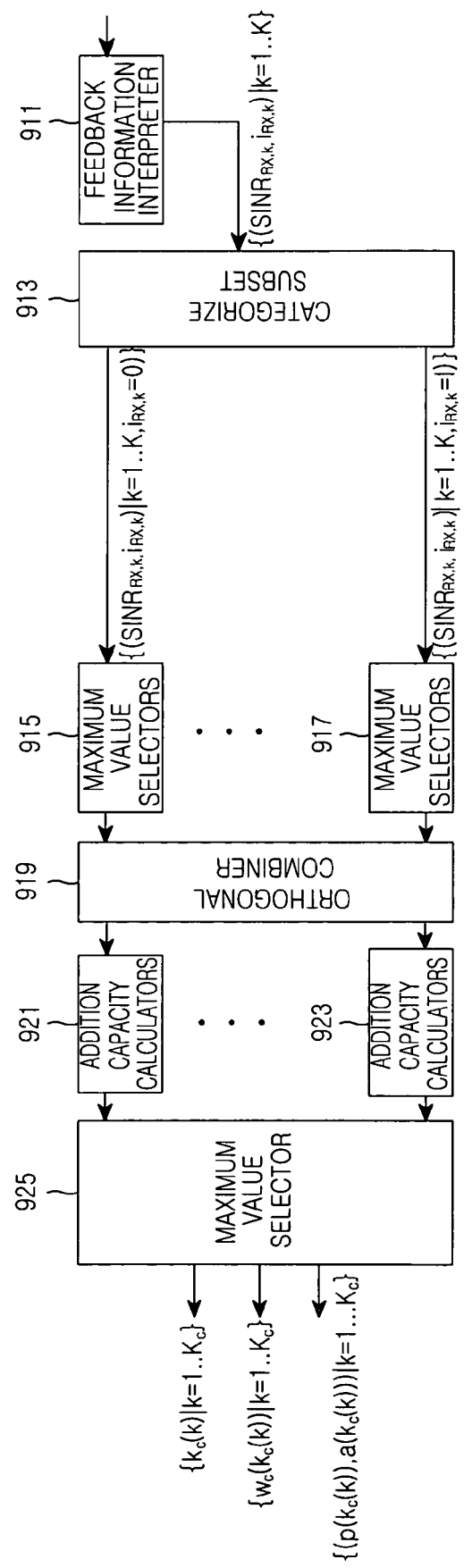
FIG. 9 is a block diagram illustrating an example of the inner configuration of the feedback information processor 313 of FIG. 3.

FIG. 9 is a block diagram illustrating an example of the inner configuration of the feedback information processor 313 of FIG. 3.

Referring to FIG. 9, the feedback information processor 313 comprises a feedback information interpreter 911, a categorize subset 913, a plurality of maximum value selectors 915 and 917, an orthogonal combiner 919, a plurality of sum capacity calculators 921 and 923 and a maximum value selector 925. The feedback information interpreter 911 interprets feedback information transmitted through the feedback information field of DPCCH from each user equipment and determines the highest SINR SINR(i(k))_and the weight index i(k) corresponding to the highest SINR SINR(i(k)). The feedback information interpreter 911 combines the interpretation results for the feedback information from all user equipment and outputs the combination results (i[k], SINR(i(k)), i.e., $\{(SINR_{RX,k}, i_{rx,k})|k=1, \ldots, K\}$, to the categorize subset 913. The categorize subset 913 receives the weights output from the feedback information interpreter 911 and the combinations of weight indices and highest SINRs, i.e., (i[k], SINR(i(k)), and categorizes the combinations (i[k], SINR(i(k)) by the kinds of weight by reference to the weight indices i(k) included in the combinations (i[k], SINR(i(k)). Then, the categorize subset 913 outputs the combinations (i[k], SINR(i(k)) categorized by the weight indices i(k) to the maximum value selector 915 or 917 according to the weight indices i(k) included in the combinations (i[k], SINR(i(k)). For example, combinations $\{(SINR_{RX,k}, i_{rx,k})|k=1, \ldots, K\}$ categorized by weight indices i($k_0$) are output to the maximum value selector 915, while combinations $\{(SINR_{RX,k}, i_{rx,k})|k=1, \ldots, K\}$ categorized by weight index i($k_1$) are output to the maximum value selector 917.

Each of the maximum value selectors 915 and 917 selects a combination having the highest SINR, among the combinations (i[k], SINR(i(k)) categorized by weights and output. Also, each of the maximum value selectors 915 and 917 outputs the selected combination to the orthogonal combiner 919. The orthogonal combiner 919 receives combinations having the highest SINR, which have been output from the maximum value selectors 915 and 917, and generates groups of orthogonal weights corresponding to the weight indices i(k) included in the combinations having the highest SINR. The orthogonal combiner 919 outputs combinations (i[k], SINR(i(k)) of the generated groups to the sum capacity calculators 921 and 923. The sum capacity calculators 921 and 923 calculate a sum capacity, i.e., throughput, for each group output from the orthogonal combiner 919 and output the calculated throughput to the maximum value selector 925. The sum capacity calculators 921 and 923 calculate the throughput from SINR(i(k) by a Shannon bound ($\log_2(1+$SINR)). The maximum value selector 925 selects the maximum value among the throughputs for the respective groups, which have been output from the sum capacity calculators 921 and 923, and generates the indices, weight vectors, power, and modulation and coding schemes for the user equipment corresponding to the selected maximum value. The generated indices, weight vectors, power, and modulation and coding schemes are output to the signal transmitter 311.

Hereinafter, an example of data communication according to the present invention will be explained in detail.

It is assumed that the base station provides two transmit antennas (N=2, N is the number of transmit antennas), the number of user equipment receiving services from the base station is four (K=4, K is the number of user equipment), the number of paths in the channel condition is two (L=2, L is the number of paths), and the number of antenna beams is four. Also, it is assumed that the four antenna beams are two orthogonal pairs. Conventional data communications will be explained first.

A user equipment selects an antenna beam for maximizing the SINR of channels, among four antenna beams. The user equipment can select an antenna beam having the highest SINR as defined in Equation 11.

$$(W_0, \gamma_0) = \underset{i}{\operatorname{argmax}}\, \gamma_i, \text{ where } \gamma_i = \|Hw_i\|^2 \qquad \text{Equation 11}$$

where H is a channel matrix for multiple paths, as well as multiple antennas.

The user equipment transmits ($w_o, \gamma_o$) selected by Equation 11 to the base station. The base station receives ($w_o(K), \gamma_o(K)$) from each user equipment and selects $w_o(K)$ having the highest SINR. The base station transmits data to the selected user equipment only. In such conventional data communication, signals cannot be transmitted to more than one user equipment at the same time, which degrades the system performance and lowers the transmission efficiency. Low transmission efficiency may be a serious problem in high-speed large data transmission.

According to the present invention, however, a user equipment selects an antenna beam for maximizing the SINR of channels, among four antenna beams. The user equipment selects an antenna beam having the highest SINR as defined in Equation 12.

$$(W_0, \gamma_0) = \arg\max_i \gamma_i,$$
$$\text{where } \gamma_i = \frac{\|Hw_i\|^2}{\sum \|Hw_i^\perp(j)\|^2 + N_0/E_h}$$

Equation 12

The user equipment transmits $(w_o, \gamma_o)$ selected by Equation 12 to the base station. The base station receives $(w_o(K), \gamma_o(K))$ from each of the four user equipment and selects the highest SINR for each $w_o(K)$ among $(w_o(K), \gamma_o(K))$. The base station calculates sum capacities of combinations of two orthogonal beams, i.e., $w_o(K)$, and selects a combination having the maximum of the calculated sum capacities. Also, the base station transmits data to the two user equipment corresponding to the selected combination. According to the present invention, signals can be transmitted through all transmit antennas at the same time, which improves the transmission efficiency and maximize the system performance in high-speed large data communication.

As described above, the present invention uses antenna beams, which are orthogonal to each other and have the maximum sum capacity, in a mobile communication system utilizing multiple antenna diversity to transmit data in Spatial Duplex Multiple Access (SDMA) simultaneously to different base stations. Therefore, the present invention can maximize the efficiency in transmission capacity even with a simple transmitting and receiving structure and less feedback data amount. When adopting the multiple antenna diversity scheme using N transmit antennas, the transmission capacity (Shannon capacity) will be increased up to N times as large as conventional multiple antenna diversity, even without additionally processing spatial signals at the base station. Thus, it is possible to use all transmit antennas and enhance the resource efficiency.

While the invention has been shown and described with reference to a certain embodiment thereof, it will be understood by those skilled in the art that various changes in form and details may be made therein without departing from the spirit and scope of the invention as defined by the appended claims or equivalents thereof.

What is claimed is:

1. A device for transmitting data by a transmit diversity scheme using multiple antennas in a mobile communication system having a transmitter comprising at least two antennas, said device comprising:
    a feedback information processor for interpreting feedback information received from a plurality of receivers, determining receivers having feedback information which are orthogonal to each other and have the maximum throughput as an addition capacity when transmitted simultaneously, and determining weights based on the feedback information of the receivers having the maximum throughput; and
    a signal transmitter for applying each of said determined weights to each antenna and transmitting data to each of said determined receivers.

2. The device according to claim 1, wherein said feedback information processor comprises:
    a feedback information interpreter for interpreting the feedback information and generating combinations including highest signal-to-interference-and-noise ratios (SINR) for the respective receivers and indices of the weights applied to the highest signal-to-interference-and-noise ratios;
    a categorize subset for categorizing the combinations by weights to correspond to the weight indices included in the combinations;
    a plurality of maximum value selectors, each for selecting a combination having the highest signal-to-interference-and-noise ratio from the combinations categorized by weights;
    an orthogonal combiner for generating orthogonal groups including orthogonality weights and highest signal-to-interference-and-noise ratios, the orthogonality weights having orthogonality with respect to each other and being selected from among the weights applied to each selected combination having the highest signal-to-interference-and-noise-ratio, the highest signal-to-interference-and-noise ratios corresponding to the orthogonal weights;
    a sum capacity calculator for calculating throughputs of respective orthogonal groups; and
    a maximum value selector for selecting the maximum throughput among throughputs of the orthogonal groups and applying indices of the orthogonality weights and receiver indices of an orthogonal group having the maximum throughput to data transmission.

3. A device for receiving transmitted data using a multiple antenna diversity scheme in a mobile communication system which has a transmitter comprising at least two antennas, said device comprising:
    a signal receiver for despreading and descrambling a received reference channel signal; and
    a feedback information generator for measuring channel characteristics based on the despread and descrambled reference channel signal and determining a weight having orthogonality to each of a preset number of weights in the mobile communication system and a weight having the highest signal-to-interference-and-noise ratio in consideration of the channel characteristics.

4. The device according to claim 3, wherein said feedback information generator comprises:
    a channel characteristic meter for measuring channel characteristics using the reference channel signal;
    a power calculator for calculating power of each of the preset number of weights based on the channel characteristics;
    a signal-to-interference-and-noise ratio (SINR) calculator for selecting one by one from calculated powers of the present number of weights and calculating a signal-to-interference-and-noise ratio using weights having orthogonality with respect to a weight applied to the selected power;
    a maximum value selector for selecting the highest value of the signal-to-interference-and-noise ratios for the preset number of weights; and
    a feedback information transmitter for transmitting the selected highest signal-to-interference-and-noise-ratio and an index of the weight applied to the highest signal-to-interference-and-noise-ratio as feedback information.

5. In a mobile communication system having a transmitter comprising at least two antennas and adopting a transmit diversity scheme using multiple antennas, a feedback information generator useful for the transmit diversity scheme comprising:

a channel characteristic meter for measuring channel characteristics using a received reference channel signal;

a power calculator for calculating power of each of the preset number of weights based on the channel characteristics;

a signal-to-interference-and-noise ratio (SINR) calculator for selecting from calculated powers of the present number of weights and calculating a signal-to-interference-and-noise ratio using weights having orthogonality with respect to a weight applied to the selected power;

a maximum value selector for selecting the highest value of the signal-to-interference-and-noise ratios for the preset number of weights; and a feedback information transmitter for transmitting the selected highest signal-to-interference-and-noise-ratio and an index of the weight applied to the highest signal-to-interference-and-noise-ratio as feedback information.

6. The feedback information generator according to claim 5, wherein said reference channel signal is a pilot channel signal.

7. A device for transmitting data by a transmit diversity scheme using multiple antennas in a mobile communication system having a transmitter comprising at least two antennas, said device comprising:

a feedback information interpreter for interpreting feedback information received from a plurality of receivers and generating combinations including the highest signal-to-interference-and-noise-ratios of respective receivers and indices of the weights applied to the highest signal-to-interference-and-noise ratios;

a categorize subset for categorizing the combinations by weights to correspond to the weight indices included in the combinations;

a plurality of maximum value selectors, each for selecting a combination having the highest signal-to-interference-and-noise-ratio, among the combinations categorized by weights;

an orthogonal combiner for generating orthogonal groups consisting of weights having orthogonality with respect to each other, among the weights applied to each selected combination having the highest signal-to-interference-and-noise-ratio, and highest signal-to-interference-and-noise-ratios corresponding to the orthogonal weights;

a sum capacity calculator for calculating throughputs of respective orthogonal groups; and a maximum value selector for selecting the maximum value of the throughputs of the orthogonal groups and applying weight indices and receiver indices of an orthogonal group having the maximum throughput to data transmission.

8. A method for transmitting data by a transmit diversity scheme using multiple antennas in a mobile communication system having a transmitter comprising at least two antennas, said method comprising:

a feedback information processing step of interpreting feedback information received from a plurality of receivers, determining receivers having feedback information which are orthogonality to each other and have the maximum throughput as an addition capacity when transmitted simultaneously, and determining weights having the maximum throughput; and a signal transmitting step of applying each of said determined weights to each antenna and transmitting data to each of said determined receivers.

9. The method according to claim 8, wherein said feedback information processing step comprises the steps of:

generating combinations including highest signal-to-interference-and-noise-ratios (SINR) for the respective receivers and indices of the weights applied to the highest signal-to-interference-and-noise ratios;

categorizing the combinations by weights to correspond to the weight indices included in the combinations;

selecting a combination having the highest signal-to-interference-and-noise-ratio among the categorized combinations;

generating orthogonal groups consisting of weights having orthogonality with respect to each other, among the weights applied to each selected combination having the highest signal-to-interference-and-noise-ratio, and highest signal-to-interference-and-noise-ratios corresponding to the orthogonal weights;

calculating throughputs of respective orthogonal groups; and selecting the maximum value of the throughputs of the orthogonal groups and applying weight indices and receiver indices of an orthogonal group having the maximum throughput to data transmission.

10. A method for receiving transmitted data by a transmit diversity scheme using multiple antennas in a mobile communication system having a transmitter comprising at least two antennas, said method comprising:

a signal receiving step of despreading and descrambling a received reference channel signal; and a feedback information generating step for measuring channel characteristics based on the despread and descrambled reference channel signal and determining a weight having orthogonality to each of a preset number of weights in the mobile communication system and a weight having the highest signal-to-interference-and-noise-ratio (SINR) in consideration of the channel characteristics.

11. The method according to claim 10, wherein said feedback information generating step comprising the steps of:

measuring channel characteristics based on the reference channel signal;

calculating power of each of the preset number of weights based on the channel characteristics;

selecting from calculated powers of the present number of weights and calculating a signal-to-interference-and-noise ratio using weights having orthogonality with respect to a weight applied to the selected power;

selecting the highest value of the signal-to-interference-and-noise ratios for the preset number of weights; and transmitting the selected highest signal-to-interference-and-noise-ratio and an index of the weight applied to the highest signal-to-interference-and-noise-ratio as feedback information.

12. A method for generating feedback information for use in a multiple antenna diversity scheme in a mobile communication system having a transmitter comprising at least two antennas and using a transmit diversity scheme, said method comprising the steps of:

measuring channel characteristics based on a received reference channel signal;

calculating power of each of the preset number of weights based on the channel characteristics;

selecting from calculated powers of the present number of weights and calculating a signal-to-interference-and-noise ratio (SINR) using weights having orthogonality with respect to a weight applied to the selected weight power;

selecting the highest value of the signal-to-interference-and-noise ratios for the preset number of weights; and transmitting the selected highest signal-to-interference-and-noise-ratio and an index of the weight applied to the selected highest signal-to-interference-and-noise-ratio as feedback information.

13. The method according to claim 12, wherein said reference channel signal is a pilot channel signal.

14. A method for transmitting data by a transmit diversity scheme using multiple antennas in a mobile communication system having a transmitter comprising at least two antennas, said method comprising the steps of:

interpreting feedback information received from a plurality of receivers and generating combinations including highest signal-to-interference-and-noise-ratios (SINR) for the respective receivers and indices of the weights applied to the highest signal-to-interference-and-noise ratios;

categorizing the combinations by weights to correspond to the weight indices included in the combinations;

selecting a combination having the highest signal-to-interference-and-noise-ratio among the categorized combinations;

generating orthogonal groups consisting of weights having orthogonality with respect to each other, among the weights applied to each selected combination having the highest signal-to-interference-and-noise-ratio, and highest signal-to-interference-and-noise-ratios corresponding to the orthogonal weights;

calculating throughputs of respective orthogonal groups; and a maximum value selector for selecting the maximum value of the throughputs of the orthogonal groups and applying weight indices and receiver indices of an orthogonal group having the maximum throughput to data transmission.

* * * * *